(12) United States Patent
Wynalda, Jr.

(10) Patent No.: US 11,140,895 B2
(45) Date of Patent: Oct. 12, 2021

(54) ELECTRONIC VAPOR DISPENSER FOR HUNTING

(71) Applicant: WYNDSCENT, LLC, Belmont, MI (US)

(72) Inventor: Robert M. Wynalda, Jr., Comstock Park, MI (US)

(73) Assignee: Wyndscent, LLC, Belmont, MI (US)

( * ) Notice: Subject to any disclaimer, the term of this patent is extended or adjusted under 35 U.S.C. 154(b) by 271 days.

(21) Appl. No.: 16/160,253

(22) Filed: Oct. 15, 2018

(65) Prior Publication Data
US 2019/0110464 A1    Apr. 18, 2019

Related U.S. Application Data

(60) Provisional application No. 62/575,105, filed on Oct. 20, 2017, provisional application No. 62/615,864, filed on Jan. 10, 2018, provisional application No. 62/572,321, filed on Oct. 13, 2017.

(51) Int. Cl.
*A01M 31/00* (2006.01)
*A01M 1/20* (2006.01)

(52) U.S. Cl.
CPC ........ *A01M 31/008* (2013.01); *A01M 1/2077* (2013.01)

(58) Field of Classification Search
None
See application file for complete search history.

(56) References Cited

U.S. PATENT DOCUMENTS

| | | | |
|---|---|---|---|
| 1,771,366 A | 10/1926 | Wyss et al. |
| 1,819,123 A | 5/1927 | Robinson |
| 1,944,108 A | 1/1934 | Robinson |
| 2,254,680 A | 8/1938 | Harvey |
| 2,311,199 A | 12/1940 | Astradsson |
| 2,614,820 A | 5/1942 | Boydjieff |
| 2,609,230 A | 6/1950 | Raleigh |
| 2,882,240 A | 4/1959 | Charwat |

(Continued)

FOREIGN PATENT DOCUMENTS

DE    19625486 A1    1/1998

*Primary Examiner* — Joseph M. Pelham
(74) *Attorney, Agent, or Firm* — Zollinger & Burleson Ltd.

(57) ABSTRACT

A hunting vaporizing device selectively receives a vaporizer housing that carries vaporizable liquid configured to be vaporized up on exposure to a vaporizing element such as a heating coil wherein the resulting vapor is distributed with air flow from an airflow generator. The vaporizer housing can be disposable and readily replaceable. The replaceable vaporizing housing allows the user replace an empty device, switch scents, or place the device in storage without the risk of spilling the liquid material. The connection between the vaporizer housing and the base is either used to deliver the electric signal to activate the vaporizing element from a power supply carried by the vaporizer housing or, alternatively, the connection is used to selectively deliver the power for the vaporizing element from a power supply carried by the base. The electrical connection is disposed within the dock that receives the vaporizer housing. The dock is recessed within the base such that a portion of the vaporizer housing is disposed within the base when the vaporizer housing is seated in the dock.

29 Claims, 8 Drawing Sheets

(56) References Cited

U.S. PATENT DOCUMENTS

| | | |
|---|---|---|
| 3,046,192 A | 7/1962 | Bilyeu |
| 3,112,645 A | 12/1963 | Glass |
| 3,200,819 A | 8/1965 | Gilbert |
| 3,207,441 A | 9/1965 | Schreiber |
| 3,366,775 A | 1/1968 | Mycue |
| 3,658,719 A | 4/1972 | McConnaughey |
| 3,990,848 A | 11/1976 | Cords |
| 3,990,987 A | 11/1976 | Rogers |
| 3,993,444 A | 11/1976 | Brown |
| 4,102,656 A | 7/1978 | Koritz |
| 4,146,566 A | 3/1979 | Gaiser |
| 4,159,672 A | 7/1979 | Garguilo et al. |
| 4,163,038 A | 7/1979 | Nishimura et al. |
| 4,166,087 A | 8/1979 | Cline et al. |
| 4,306,679 A | 12/1981 | Dusek et al. |
| 4,327,056 A | 4/1982 | Gaiser |
| 4,346,059 A | 8/1982 | Spector |
| 4,423,626 A | 1/1984 | Herschede |
| 4,666,638 A | 5/1987 | Baker et al. |
| 4,742,960 A | 5/1988 | Bustillo et al. |
| 4,771,563 A | 9/1988 | Easley |
| 4,813,437 A | 3/1989 | Ray |
| 4,869,407 A | 9/1989 | Booth, Jr. et al. |
| 4,922,901 A | 5/1990 | Brooks et al. |
| 4,937,431 A | 6/1990 | Jameson et al. |
| 4,953,763 A | 9/1990 | Kierum et al. |
| 5,094,024 A | 3/1992 | Duke |
| 5,094,025 A | 3/1992 | Daniels |
| 5,117,821 A | 6/1992 | White |
| 5,161,646 A | 11/1992 | Aurich et al. |
| 5,186,118 A | 2/1993 | Stinson |
| 5,261,424 A | 11/1993 | Sprinkel, Jr. |
| 5,305,541 A | 4/1994 | Simpson |
| 5,307,584 A | 5/1994 | Jarvis |
| 5,359,801 A | 11/1994 | Mattucci et al. |
| 5,388,762 A | 2/1995 | Bryson, Sr. |
| 5,429,271 A | 7/1995 | Porter |
| 5,547,616 A | 8/1996 | Dancs et al. |
| 5,622,314 A | 4/1997 | Eason |
| 5,700,430 A | 12/1997 | Bonnema et al. |
| 5,744,106 A | 4/1998 | Eagle |
| 5,832,648 A | 11/1998 | Malone |
| 5,894,841 A | 4/1999 | Voges |
| 5,896,692 A | 4/1999 | Collora et al. |
| 5,901,490 A | 5/1999 | Lush |
| 5,914,119 A | 6/1999 | Dawson |
| 5,944,508 A | 8/1999 | Bonnema |
| 5,970,643 A | 10/1999 | Gawel, Jr. |
| 6,038,805 A | 3/2000 | Smidtke |
| 6,050,016 A | 4/2000 | Cox |
| 6,062,425 A | 5/2000 | Brown et al. |
| 6,240,248 B1 | 5/2001 | Fore |
| 6,241,161 B1 | 6/2001 | Corbett |
| 6,254,836 B1 | 7/2001 | Fry |
| 6,341,718 B1 | 1/2002 | Schilthuizen et al. |
| 6,361,752 B1 | 3/2002 | Demarest et al. |
| 6,421,502 B1 | 7/2002 | Aronie et al. |
| 6,443,434 B1 | 9/2002 | Prather |
| 6,589,487 B1 | 7/2003 | Ly et al. |
| 6,592,104 B2 | 7/2003 | Cox |
| 6,610,254 B1 | 8/2003 | Furner et al. |
| 6,655,604 B2 | 12/2003 | Tuttobene, Jr. |
| 6,737,025 B2 | 5/2004 | Boyd et al. |
| 6,745,950 B1 | 6/2004 | Longo |
| 6,783,081 B2 | 8/2004 | Pedrotti et al. |
| 6,820,363 B1 | 11/2004 | Averette, Jr. |
| 6,857,214 B1 | 2/2005 | Pelissier |
| 6,931,202 B2 | 8/2005 | Pedrotti et al. |
| 6,983,103 B1 | 1/2006 | Parcher |
| 7,093,770 B1 | 8/2006 | Moran |
| 7,133,605 B2 | 11/2006 | Niemeyer |
| 7,167,776 B2 | 1/2007 | Maharajh et al. |
| 7,290,445 B2 | 11/2007 | Kirollos et al. |
| 7,341,208 B2 | 3/2008 | Peters et al. |
| 7,350,411 B2 | 4/2008 | Anderson |
| 7,367,334 B2 | 5/2008 | Faison, Jr. et al. |
| 7,377,493 B2 | 5/2008 | Thomas |
| 7,419,102 B2 | 9/2008 | Harris, Jr. |
| 7,438,873 B2 | 10/2008 | Saxon et al. |
| 7,455,248 B2 | 11/2008 | Kablik et al. |
| 7,499,632 B2 * | 3/2009 | Granger ............ A01M 1/2033 392/386 |
| 7,682,575 B2 | 3/2010 | Hurwitz et al. |
| 7,721,597 B2 | 5/2010 | Onishi |
| 7,765,863 B1 | 8/2010 | Woolsey |
| 7,845,359 B2 | 12/2010 | Montaser |
| 7,874,207 B2 | 1/2011 | Galley et al. |
| 7,883,677 B2 | 2/2011 | Palozzi |
| 7,981,367 B2 | 7/2011 | Kvietok et al. |
| 7,997,280 B2 | 8/2011 | Rosenthal |
| 8,061,628 B1 | 11/2011 | Kvietok et al. |
| 8,156,944 B2 | 4/2012 | Han |
| 8,422,869 B2 | 4/2013 | Joseph |
| 8,424,379 B2 | 4/2013 | Bibby |
| 8,490,889 B2 | 7/2013 | Rydbom |
| 8,672,725 B1 | 3/2014 | Betts |
| 8,881,737 B2 | 11/2014 | Collett et al. |
| 8,903,228 B2 | 12/2014 | Goodman et al. |
| 8,905,667 B1 | 12/2014 | Burks |
| 8,910,640 B2 | 12/2014 | Sears et al. |
| 9,072,859 B2 | 7/2015 | Ishikita |
| 9,078,474 B2 | 7/2015 | Thompson |
| 9,320,300 B2 | 4/2016 | Hon |
| 9,352,062 B2 | 5/2016 | Klemm et al. |
| 9,426,977 B1 * | 8/2016 | Wynalda, Jr. ............ F22B 1/284 |
| 9,491,940 B2 | 11/2016 | LaRosa |
| 9,532,597 B2 | 1/2017 | Tucker et al. |
| 9,585,981 B2 * | 3/2017 | Wynalda, Jr. ....... A01M 1/2072 |
| 9,603,387 B2 | 3/2017 | Liu |
| 9,739,796 B2 | 8/2017 | Ferrara, Jr. |
| 9,936,687 B1 | 4/2018 | Keen et al. |
| 9,975,668 B1 | 5/2018 | Rimmer |
| 9,989,552 B2 * | 6/2018 | Ferrara, Jr. ......... A01M 31/008 |
| 10,114,036 B2 * | 10/2018 | Ferrara, Jr. ............... F22B 1/28 |
| 10,219,508 B1 | 3/2019 | Strauser |
| 10,278,382 B2 * | 5/2019 | Wynalda, Jr. ........... A61L 9/037 |
| 10,306,929 B2 | 6/2019 | Liu |
| 10,349,678 B2 | 7/2019 | Chen |
| 10,357,063 B1 | 7/2019 | Fornarelli |
| 10,405,585 B2 | 9/2019 | Alarcon et al. |
| 10,598,685 B2 * | 3/2020 | Ferrara, Jr. ............... F22B 1/28 |
| 2002/0071664 A1 | 6/2002 | Aronie et al. |
| 2003/0020185 A1 | 1/2003 | Cox |
| 2003/0132219 A1 | 7/2003 | Cox et al. |
| 2004/0060192 A1 | 4/2004 | Gronka |
| 2004/0221841 A1 | 11/2004 | Herschel |
| 2005/0016550 A1 | 1/2005 | Katase |
| 2005/0185940 A1 | 8/2005 | Joshi et al. |
| 2005/0230426 A1 | 10/2005 | de la Guardia |
| 2006/0042373 A1 | 3/2006 | Kirollos et al. |
| 2006/0213221 A1 | 9/2006 | Lee et al. |
| 2008/0098952 A1 | 5/2008 | Healy et al. |
| 2008/0149665 A1 | 6/2008 | Hafer et al. |
| 2008/0244954 A1 | 10/2008 | Shannon |
| 2009/0114228 A1 | 5/2009 | Kirschner |
| 2009/0147506 A1 | 6/2009 | Robinson |
| 2009/0199860 A1 | 8/2009 | Kress et al. |
| 2009/0253101 A1 | 10/2009 | Arnold |
| 2009/0260271 A1 | 10/2009 | Bailey |
| 2009/0277972 A1 | 11/2009 | Kennon et al. |
| 2009/0277973 A1 | 11/2009 | Kennon |
| 2010/0031968 A1 | 2/2010 | Sheikh et al. |
| 2010/0059601 A1 | 3/2010 | Bankers et al. |
| 2010/0126505 A1 | 5/2010 | Rinker |
| 2010/0224119 A1 | 9/2010 | Morris |
| 2010/0242974 A1 | 9/2010 | Pan |
| 2011/0005535 A1 | 1/2011 | Xiu |
| 2011/0011396 A1 | 1/2011 | Fang |
| 2011/0036346 A1 | 2/2011 | Cohen et al. |
| 2011/0097060 A1 | 4/2011 | Buzzetti |
| 2011/0120482 A1 | 5/2011 | Brenneise |
| 2011/0142429 A1 | 6/2011 | Joseph |
| 2011/0226236 A1 | 9/2011 | Buchberger |
| 2012/0111347 A1 | 5/2012 | Hon |

(56) References Cited

U.S. PATENT DOCUMENTS

| | | |
|---|---|---|
| 2012/0204889 A1 | 8/2012 | Xiu |
| 2012/0230659 A1 | 9/2012 | Goodman et al. |
| 2012/0272968 A1 | 11/2012 | Kirschner |
| 2013/0213418 A1 | 8/2013 | Tucker et al. |
| 2013/0220315 A1 | 8/2013 | Conley et al. |
| 2013/0240638 A1 | 9/2013 | Kaplan et al. |
| 2014/0205272 A1 | 7/2014 | Midgette et al. |
| 2014/0276177 A1 | 9/2014 | Brambilla et al. |
| 2014/0290650 A1* | 10/2014 | Ivey ............... A24F 47/008 128/202.21 |
| 2014/0334801 A1 | 11/2014 | Browder et al. |
| 2014/0352630 A1 | 12/2014 | Messina |
| 2015/0027456 A1 | 1/2015 | Janardhan et al. |
| 2015/0027459 A1 | 1/2015 | Collett et al. |
| 2015/0181944 A1 | 7/2015 | Li et al. |
| 2015/0189855 A1 | 7/2015 | Norris |
| 2015/0245659 A1 | 9/2015 | DePiano et al. |
| 2015/0257449 A1 | 9/2015 | Gabbay |
| 2015/0296884 A1 | 10/2015 | Liu |
| 2015/0359230 A1 | 12/2015 | Messina |
| 2015/0374039 A1 | 12/2015 | Zhu |
| 2016/0069924 A1 | 3/2016 | Norris et al. |
| 2016/0143364 A1 | 5/2016 | DePiano et al. |
| 2016/0174611 A1 | 6/2016 | Monsees et al. |
| 2016/0282381 A1 | 9/2016 | Ferrara, Jr. |
| 2016/0309701 A1 | 10/2016 | DeHaven |
| 2016/0310624 A1* | 10/2016 | Wynalda, Jr. ............ F22B 1/284 |
| 2016/0324141 A1 | 11/2016 | Barney |
| 2016/0339461 A1 | 11/2016 | Kaplan et al. |
| 2016/0360786 A1* | 12/2016 | Bellinger ................ A24F 40/53 |
| 2017/0238527 A1* | 8/2017 | Wynalda, Jr. ......... H05B 3/0014 |
| 2017/0290650 A1 | 10/2017 | Levinson |
| 2017/0348505 A1 | 12/2017 | Doo et al. |
| 2018/0206478 A1* | 7/2018 | Wynalda, Jr. ......... A01M 1/2077 |
| 2018/0275158 A1* | 9/2018 | Ferrara, Jr. ............ A01M 31/00 |
| 2019/0064200 A1* | 2/2019 | Ferrara, Jr. ............ A01M 31/00 |

* cited by examiner

ELECTRONIC VAPOR DISPENSER FOR HUNTING

CROSS REFERENCE TO RELATED APPLICATIONS

This application claims the benefit of U.S. Provisional Patent Application Nos. 62/572,321 filed Oct. 13, 2017, 62/575,105 filed Oct. 20, 2017, and 62/615,864 filed Jan. 10, 2018; the disclosures of each are incorporated herein by reference.

BACKGROUND OF THE DISCLOSURE

1. Technical Field

The disclosure generally relates to vaporizing devices used to make and distribute airborne vapors that can carry a scent such as those used as an aromatic hunting lure. The vapor is visible and can be used as a wind direction indicator. Specifically, the disclosure relates to a device configured to selectively receive a vaporizer housing that carries vaporizable liquid configured to be vaporized upon exposure to a vaporizing element such as a heating coil wherein the resulting vapor is distributed with air flow from an airflow generator.

2. Background Information

Aromatic materials have long been used by hunters to lure or attract game animals toward a position within range of the hunter. Examples of aromatic materials include doe urine and sweet smelling items such as apple and corn. In some cases, a hunter spreads the smell of a buck in order to lure a different buck seeking to defend territory. Other urines and gland secretions are also used as well as naturally occurring smells from trees and bushes favored by game.

In certain instances, deer hunters, utilizing the aforementioned liquid urine, hunt near scrape marks which have been formed in the ground by the hooves of the deer crossing the territory. Deer scrape the ground to provide a location for defecation or urination, and consequently other deer are attracted to the odors emanating from previously formed scrapes. As a consequence, it is advantageous for hunters to distribute quantities of urine near the previously formed scrapes. A few drops of the liquid urine may be sprinkled in each of the scrapes within range, and in addition a bottle or vial containing some of the liquid urine may be left open on the ground, so that a portion of the liquid urine evaporates into the air to further distribute the aroma.

Unfortunately, individuals hunting in freezing conditions have found that the urine freezes after a certain time in the field, rendering the relatively expensive product useless. In addition, containers or vials which are left on the ground for vaporization of the liquid urine occasionally tip due to the influence of wind and spill the expensive liquid contents onto the earth. Another problem is distributing the smell of the material into the air effectively. One solution to the problem of freezing lure is disclosed in U.S. Pat. No. 3,046,192 which uses a hand warmer to warm the lure. Other devices use a burning fuel to warm the material in order to increase the rate of evaporation. One device uses an electrically-powered heater disposed within a wick to warm material drawn to the heater. U.S. Pat. No. 9,426,977 discloses a vaporizing device that generates and distributes an aromatic vapor from liquid scent material carried by the device. Despite the effectiveness of the embodiments discloses in the '977 patent, improvements to the manner in which liquid material is added to the device are desired.

SUMMARY OF THE DISCLOSURE

The disclosure provides vaporizing devices that are used to make and distribute airborne vapors that can carry a scent such as those used as an aromatic hunting lure.

The disclosure provides vaporizing devices that make and distribute visible vapor that can be used as a wind direction indicator.

The disclosure provides vaporizing devices that selectively receive a vaporizer housing that carries vaporizable liquid configured to be vaporized upon exposure to a vaporizing element such as a heating coil wherein the resulting vapor is distributed with air flow from an airflow generator. The vaporizer housing can be disposable and readily replaceable. The replaceable vaporizing housing allows the user replace an empty device, switch scents, or place the device in storage without the risk of spilling the liquid material. The connection between the vaporizer housing and the base is used to deliver the electric signal to activate the vaporizing element from a power supply carried by the vaporizer housing. Alternatively, the connection between the vaporizer housing and the base is used to selectively deliver the power for the vaporizing element from a power supply carried by the base. The electrical connection is disposed within the dock that receives the vaporizer housing. The dock is recessed within the base such that a portion of the vaporizer housing is disposed within the base when the vaporizer housing is seated in the dock. The airflow that distributes the vapor from the vaporizer housing is delivered through the dock.

The disclosure provides embodiments that use a timer to periodically activate the device to make and distribute the vapor over a selected distribution pattern. The disclosure provides embodiments that include a switch which is physically pushed by the user to activate the device to make and distribute the vapor. The disclosure also provides embodiments that use a remote control to allow a user to start and stop the making and distributing of the vapor.

The disclosure provides embodiments that electronically control the vaporizing element. The electronic control provides timing control and activation independent of the airflow delivered to the vaporizer housing.

The disclosure provides embodiments that use metal coil vaporizing elements and embodiments that use ceramic burners which eliminate burning smells.

The disclosure provides embodiments that uses standard disposable alkaline batteries as the power source for the device.

The preceding non-limiting aspects, as well as others, are more particularly described below. A more complete understanding of the processes and devices can be obtained by reference to the accompanying drawings, which are not intended to indicate relative size and dimensions of the assemblies or components thereof. In those drawings and the description below, like numeric designations refer to components of like function. Specific terms used in that description are intended to refer only to the particular structure of the embodiments selected for illustration in the drawings, and are not intended to define or limit the scope of the disclosure.

DETAILED DESCRIPTION OF THE DISCLOSURE

Exemplary electronic vaporizers are indicated generally by the reference numeral 2 in the accompanying drawings. Vaporizer 2 generally includes a base 4 and a removable vaporizer housing 6. When in use, vaporizer 2 carries a liquid scent material that is selectively vaporized and distributed as an airborne vapor that can be used as a lure designed to attract hunting game, as a repellant to drive game away from an area, or as an air freshener. Vaporizer 2 is configured to allow the user to readily remove and replace vaporizer housing 6 such that the user can replace an empty housing 6 with a full housing 6, switch scents, or place the device in storage without the risk of spilling the liquid material.

Base 4 of device 2 carries a power supply 10 which can be disposable batteries or rechargeable batteries. Device 2 can be configured to operate with three AA alkaline batteries. The timing of the power delivery from alkaline batteries is not critical in device 2 because immediately heating the coil is not critical because the vapor is not being inhaled by a user compared to a nicotine vaporizer. Power supply 10 can be removed from base 4 through an end hatch 12 which is threaded and sealed by a gasket or O-ring. In other configurations, an external power supply can be used and attached by a cord through an appropriate port 14. A switch 16 is provided to use power from port 14 when such power is available. This configuration allows device 2 to be powered by a USB cord from a phone, computer, or vehicle, from a 12V outlet in a vehicle or a building, an external battery pack, or from a wall outlet. Appropriate power converters are provided as necessary with each input to supply the needed voltage and current to the powered components of device 2. Port 14 also allows rechargeable batteries to be recharged without removing them from base 4.

Figure 1:
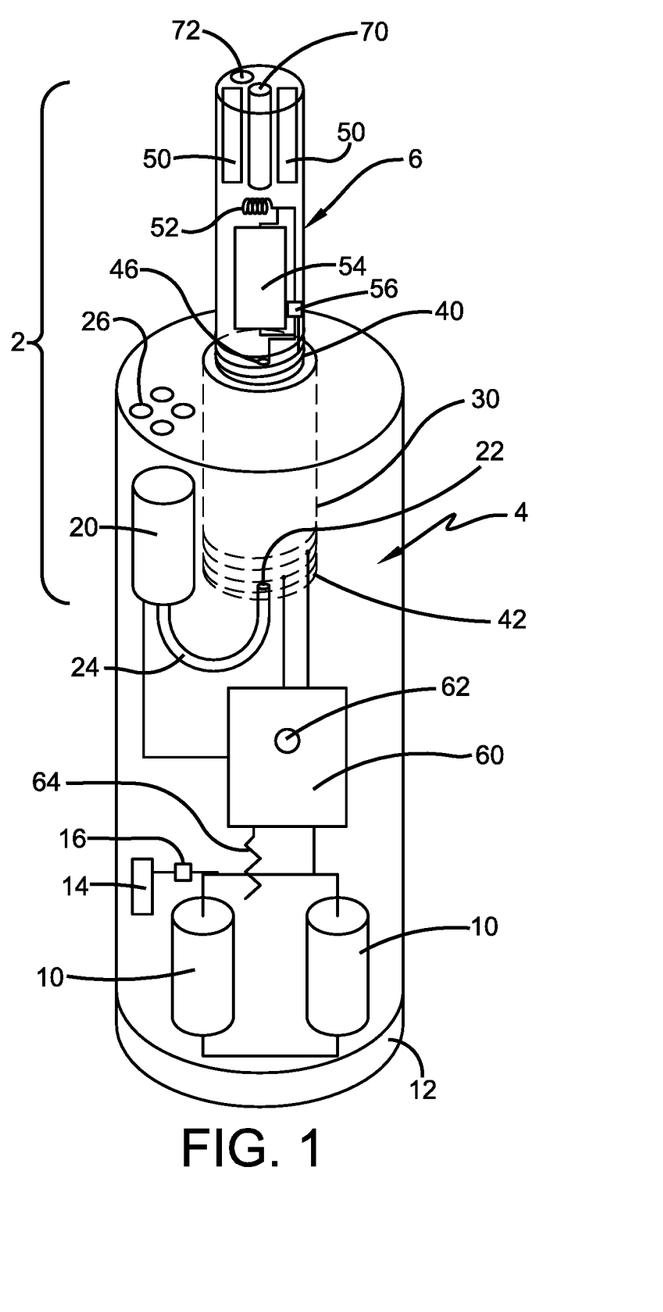
FIG. 1 is a schematic view of an exemplary configuration of the electronic vapor dispenser.

Base 4 also carries an airflow generator 20 which delivers a concentrated flow of air to a base airflow outlet 22. In the configurations depicted in FIGS. 1 and 14, an air pump delivers the airflow through a flexible tube 24. The pump can be quiet itself (about 10 dB or at least less than 20 dB) while running or both quiet and surrounded by sound insulating material. In another configuration depicted in FIG. 15, a fan 20 delivers the airflow to a plenum 23 that is in fluid communication with base airflow outlet 22. In another configuration, mechanical bellows are provided to deliver airflow to base airflow outlet 22. In another configuration, a squeezable bladder is used to create the airflow that is delivered to base airflow outlet 22. The squeezable bladder extends through a portion of a wall on base 4 or can surround all of or a majority of the components of base 4. The bladder can be squeezed with a mechanism driven by a motor. In each of these configurations, air inlets 26 can be defined in a portion of the wall of base 4.

Figure 13:
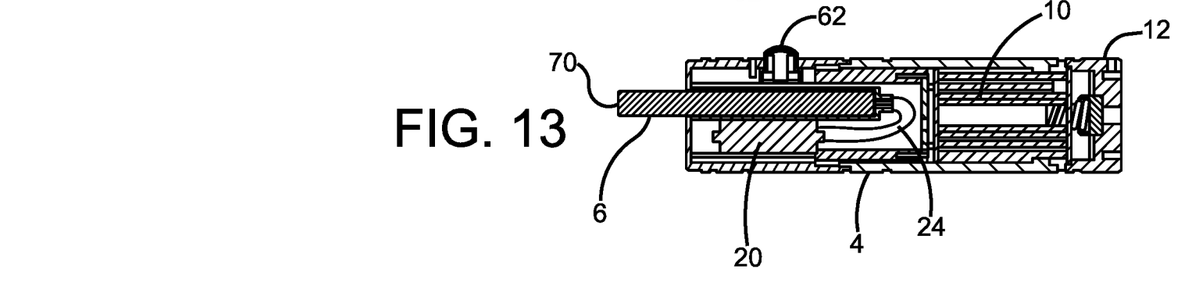
FIG. 13 is schematic section view taken along line 13-13 of FIG. 12.

Base 4 includes a recessed dock 30 that removably and replaceably receives vaporizer housing 6. In the exemplary configuration, vaporizer housing 6 includes a threaded end 40 that is threadedly engaged with a matching threaded adapter 42 carried by or defined by housing 4. In this configuration, threaded adapter 42 is disposed at the lower end of the recessed dock 30 that receives all of, a majority of, or a portion of vaporizer housing 6. FIG. 13 depicts a configuration with a majority of a generally cylindrical vaporizer housing disposed within a generally cylindrical base 4. In this configuration, a portion of vaporizer housing 6 is disposed directly between airflow generator 20 and the controls of device 2. This provides for compact overall dimensions with the weight of power supply 10 in the larger base 4 providing stability with the top outlet 70 of housing 6 disposed up in the air for the distribution of vapor. Tripod legs or a base stand can be used with base 4.

Another configuration provides dock 30 extending up from base 4 in the form of a flexible boot that frictionally receives the end of vaporizer housing 6. Both of these adapters provide a tight fit between base 4 and vaporizer housing 6 such that a majority of the airflow being delivered through outlet 22 is delivered into an airflow inlet 46 of vaporizer housing 6.

Vaporizer housing 6 carries a supply 50 of vaporizable liquid material that is rapidly vaporized when in contact with a source of heat which is generated by a portion of an electric vaporizing element 52. Supply 50 can be refillable and reusable or single-use and disposable. When configured as a single use, disposable unit, supply 50 is removable and replaceable with respect to vaporizer housing 6. In other configurations, the entire housing 6, including supply 50, is removed, disposed of or recycled, and replaced. Supply 50 can have a transparent wall to allow the user to view the liquid in supply 50. The liquid from supply 50 is brought into contact with a portion of electric vaporizing element 52 through a wick or a small opening in supply 50. Electric vaporizing element includes a heating element that can be a metal or a ceramic or a combination of materials (such as a ceramic coated metal wire). The heating element can be in the form of a coil and is also referred to as a coil. The heating element becomes hot when subjected to electric current. The coil can be wrapped around a non-burnable support member that delivers the vaporizable liquid material to the coil to be vaporized. The support member or members can be ceramic. A benefit of using a ceramic or other porous non-burnable support member is the elimination of any burning of the wicking material which can add a burning scent to the vapor which is smelled by game. The wick can be a fabric (such as cotton) or a porous material that will not readily burn at the temperature of electric vaporizing element 52. Wicks such as ceramic, glass, or natural stone can be used to bring the liquid scent material into contact with or close proximity to the heating element of electric vaporizing element 52. One type of coil or heating element is provided as a microporous ceramic element in contact with a resistive wire. When power is delivered to the wire, it heats up the ceramic. The ceramic element itself is a wick; because of its microporous structure the vaporizable liquid moves through it by capillary action. The bigger surface area of a microporous material contributes to enhance the amount of vapor being created. The absence of contact between the resistive wire and the liquid also prevents popping noises and the elimination of a fabric wick eliminates burning smells. The heating device can be rapidly heated to a temperature sufficient to rapidly vaporize (less than one to three seconds) the vaporizable liquid material that is in close proximity or in contact with the heating device. The heating device can be heated to a temperature of 390-480 degrees Fahrenheit. In one exemplary embodiment, the liquid scent material is heated to a temperature sufficient to change the liquid scent material from the liquid state to the aerosolized vapor. Other temperature ranges can be used to vaporize the liquid scent material.

Figure 2:
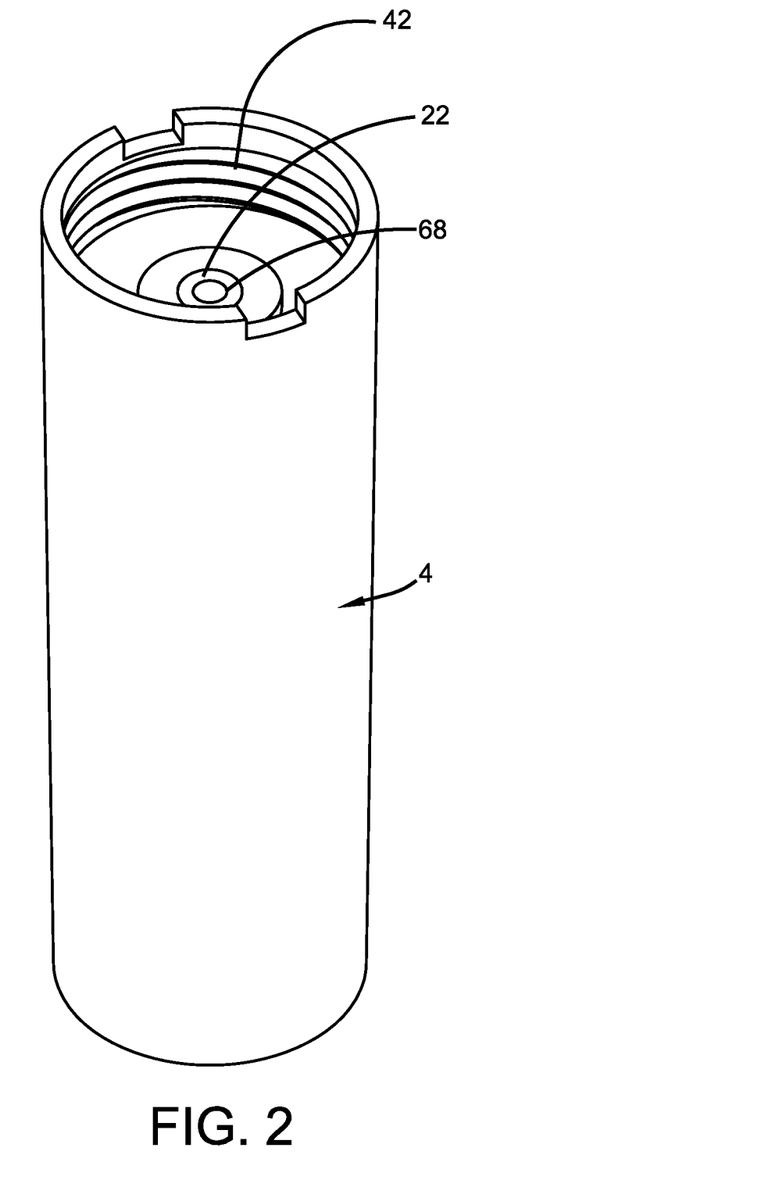
FIG. 2 is a perspective view of an exemplary threaded dock.
Figure 3:
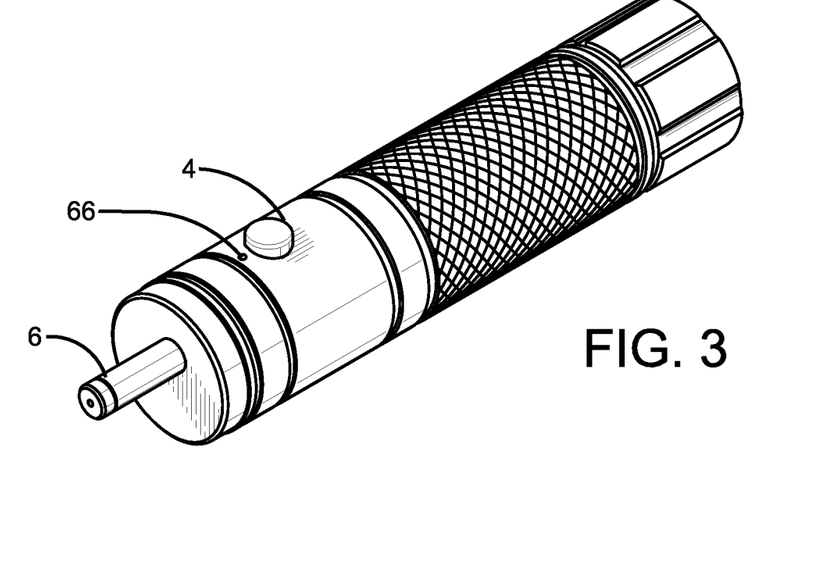
FIG. 3 is a top left perspective view of an exemplary electronic vapor dispenser.
Figure 4:
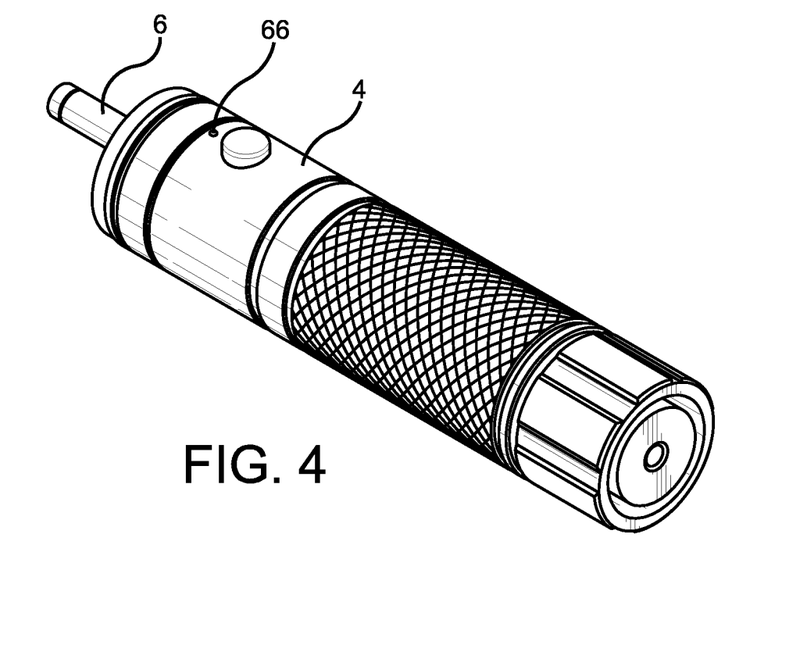
FIG. 4 is a bottom left perspective view of the exemplary electronic vapor dispenser of FIG. 3.
Figure 5:
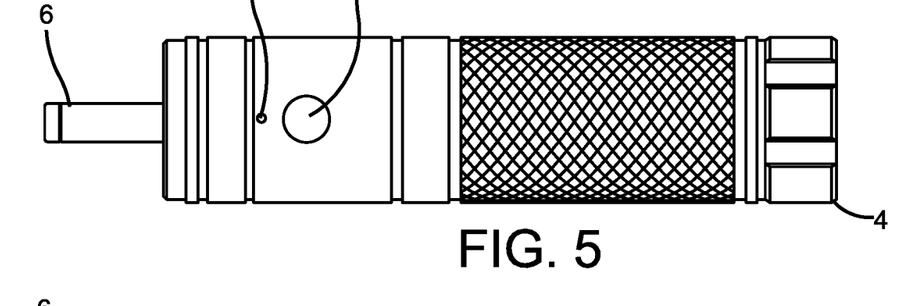
FIG. 5 is a front elevation view of FIG. 3.
Figure 6:
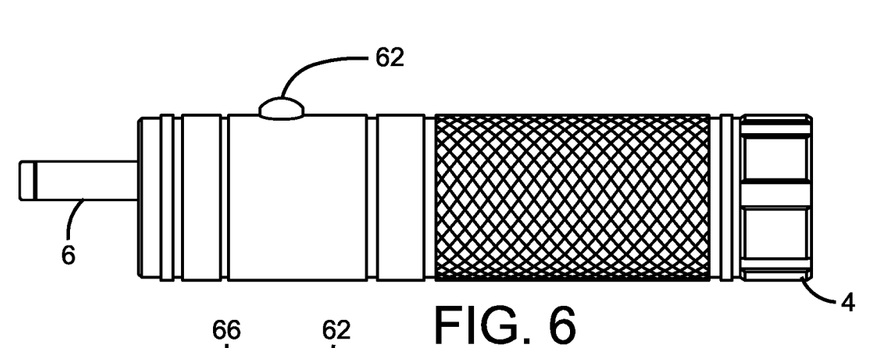
FIG. 6 is a left side elevation view of FIG. 3.
Figure 7:
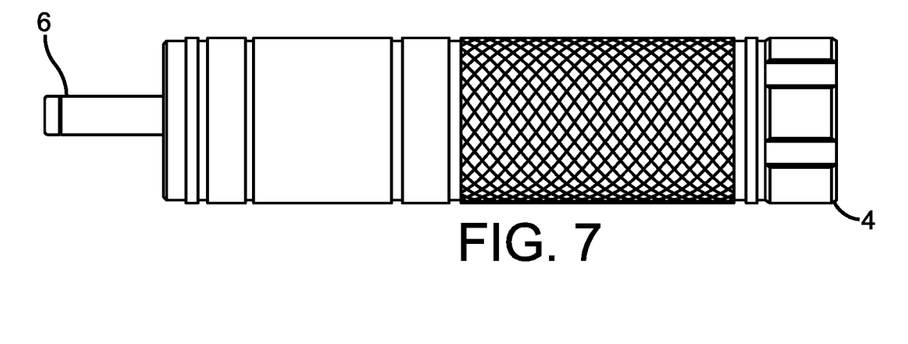
FIG. 7 is a rear elevation view of FIG. 3.
Figure 8:
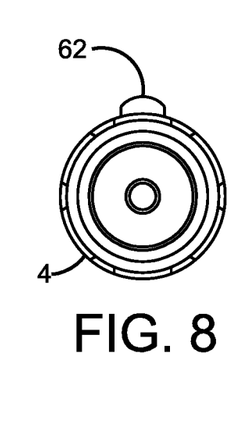
FIG. 8 is a bottom plan view of FIG. 3.
Figure 9:
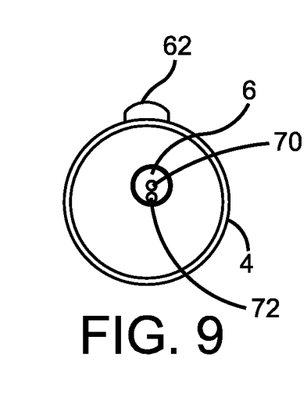
FIG. 9 is a top plan view of FIG. 3.
Figure 10:
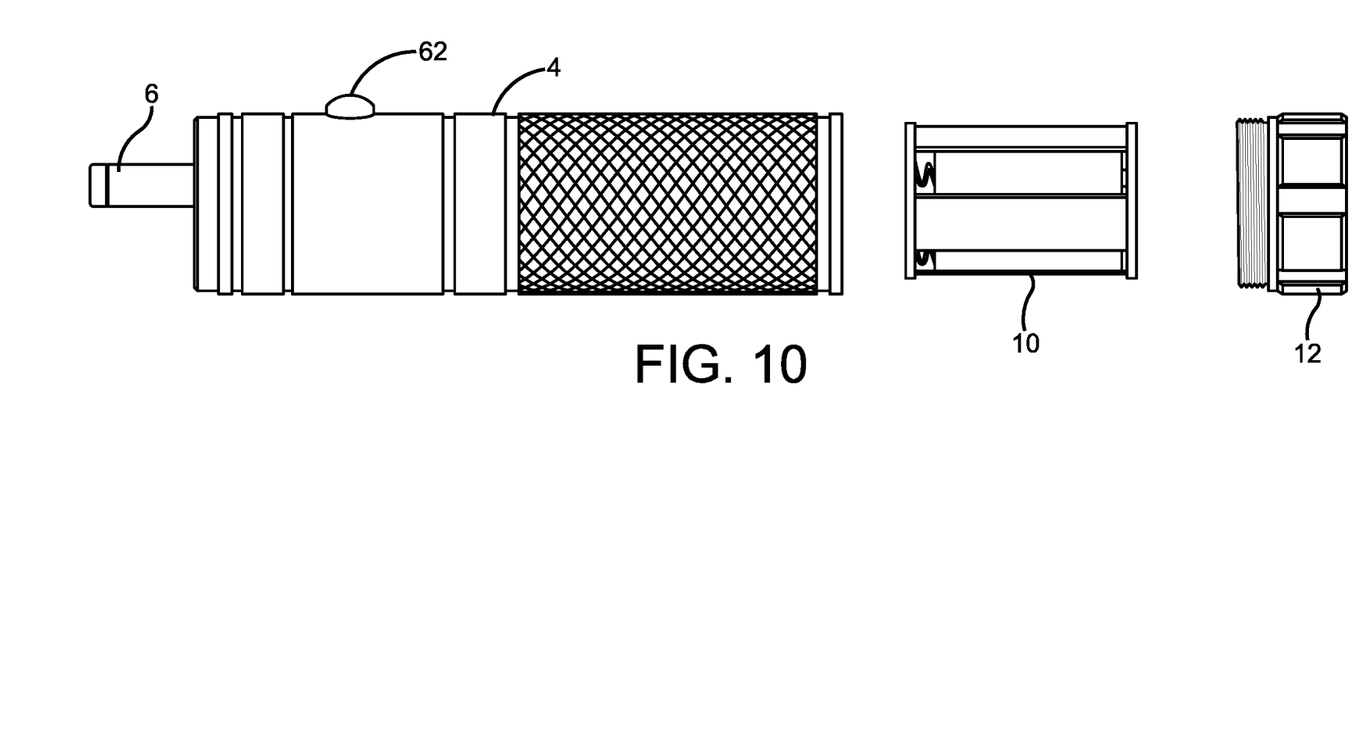
FIG. 10 is an exploded view with the power supply removed from the base.
Figures 11, 12:
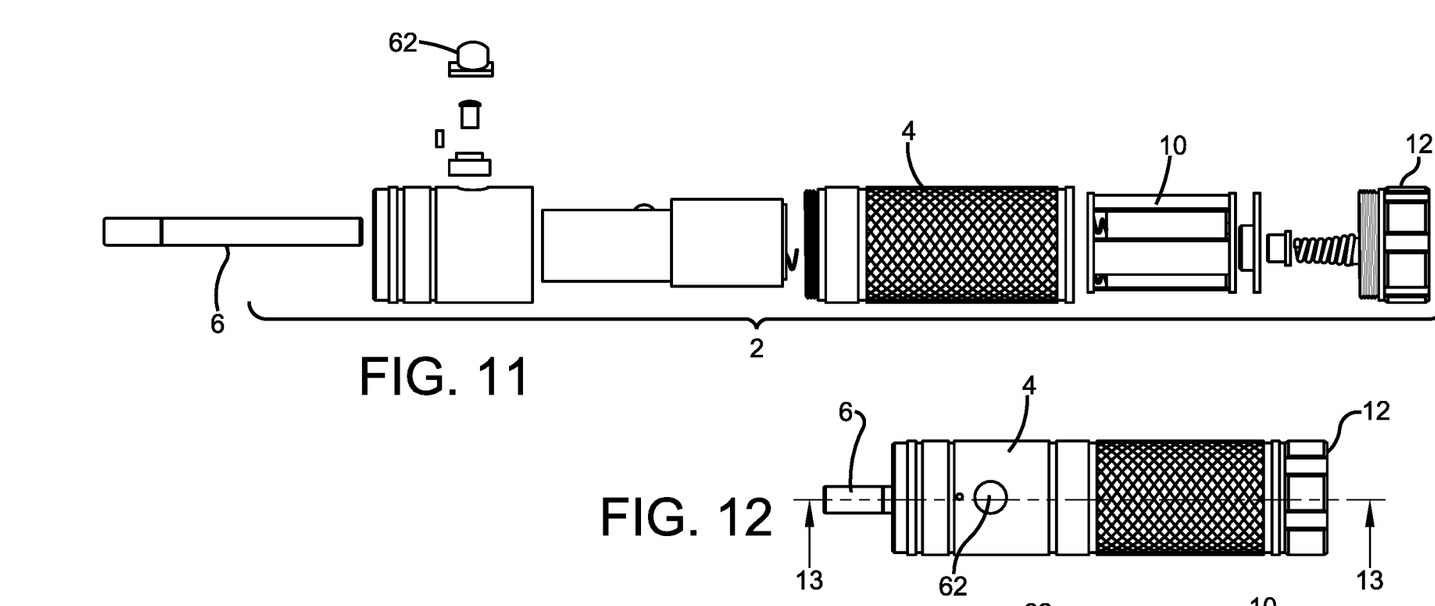
FIG. 11 is an exploded view of the device of FIG. 3.
FIG. 12 is a front elevation view of the device of FIG. 3.

In some configurations, vaporizer housing 6 includes its own power source 54. This can be a disposable internal alkaline battery to power the heating element of electric vaporizing element 52. Vaporizer housing 6 also can be powered by power supply 10. The activation of power supply 54 and thus vaporizing element 52 is controlled by an electric activation element 56 such as a sensor that monitors switch 62 or the electrical status of airflow generator 20 or element 56 is provided as a switch that is opened and closed with an electric signal delivered from a base control such as a system on a chip or controller or microcontroller 60 that governs the operation of device 2 or just an on/off operation switch 62, or a combination of both. The activation signal is delivered through an electric circuit or through a wireless signal. The electric circuit extends through dock 30 and is made when vaporizer housing 6 is mounted to base 4 and broken when housing 6 is dismounted from base 4. One branch of the electric circuit is formed through the threaded connection of the threaded portion 40 of housing 6 and the threads 42 of dock 30. Another branch of the electric circuit is provided through contacts (such as contact 68 in FIG. 2) disposed around or near base airflow outlet 22 and another disposed in a complementary position around or near housing airflow inlet 46. Other contact locations can be used such as through a portion of the sidewall of housing 6 which is disposed within base 4.

The vapor created by vaporizing element 52 is distributed by the airflow delivered from airflow generator 20 from vaporizer housing 6 through outlet 70. Power supply 54 is sized to expire at about the same time supply 50 runs out in the configurations where the entire housing is removed and replaced.

An option for vaporizer housing 6 is to include a light source 72 such as an LED that is selectively powered to allow the user to view the vapor being distributed from outlet 70 in low light situations. Light source 72 also allows device 2 to function as a small flash light. Light source 72 can be disposed at the end of housing 6 next to outlet 70. Light source 72 can be powered by either power source 10 or 54 and can be independently switched or automatically powered when power is delivered to vaporizing element 52.

Figure 14:
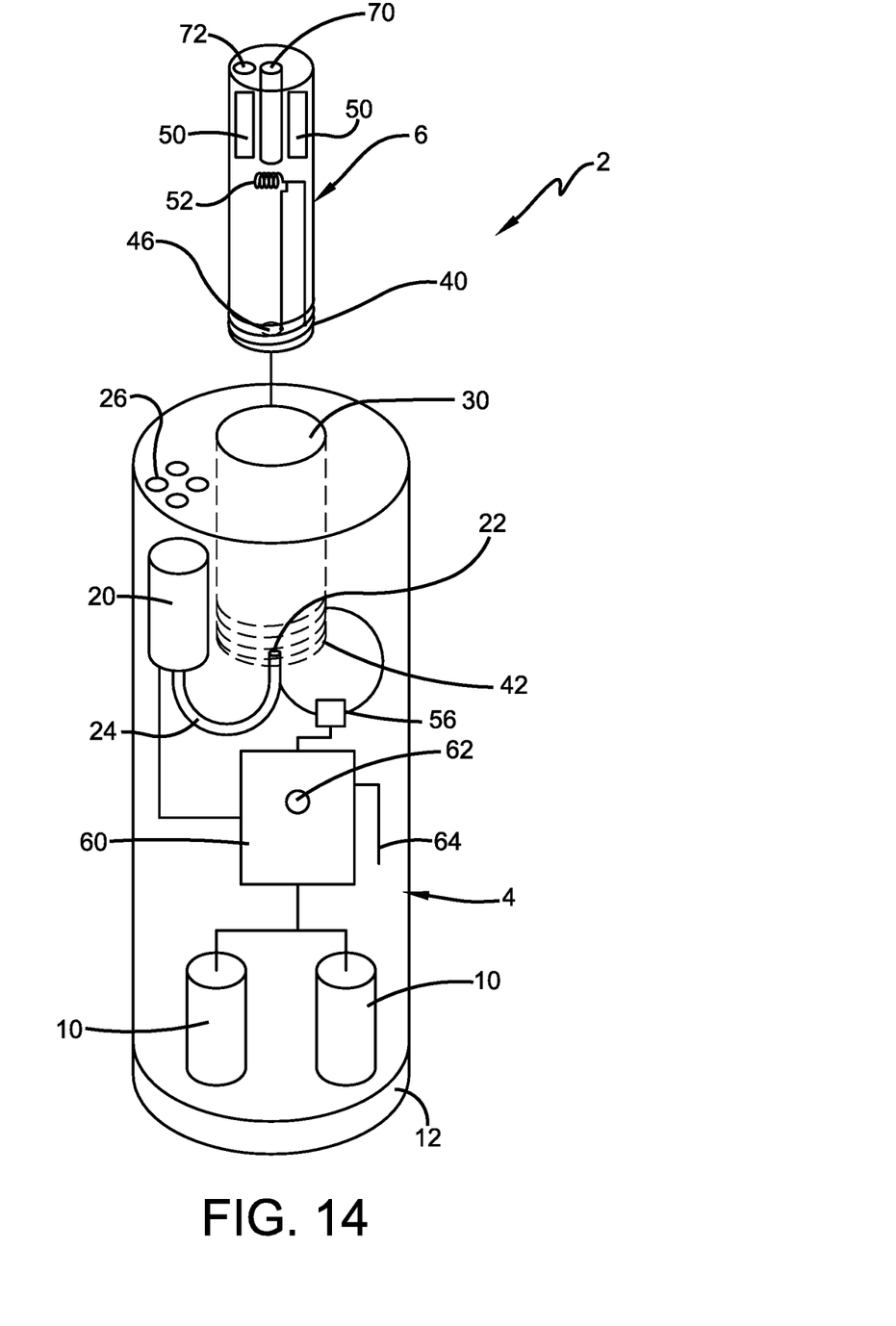
FIG. 14 is a schematic view of another exemplary configuration of the electronic vapor dispenser.
Figure 15:
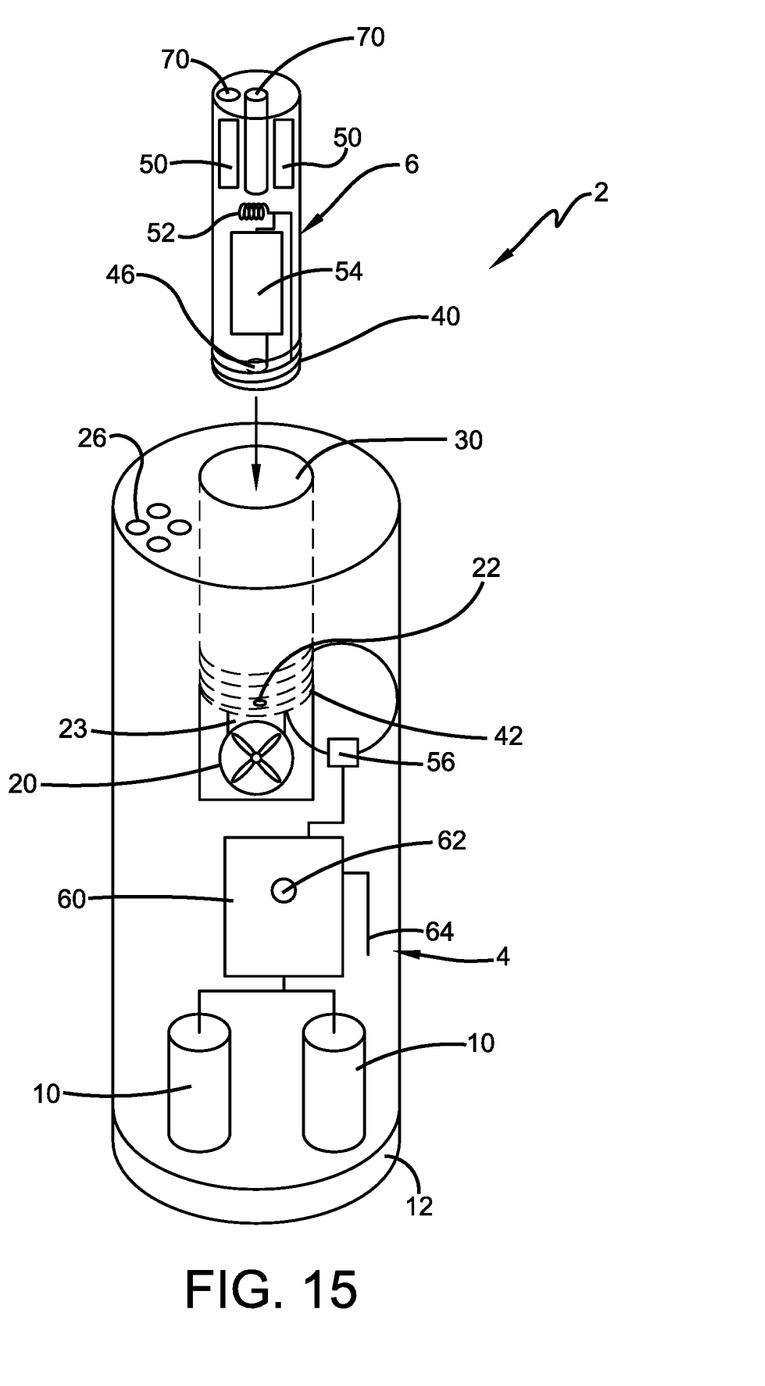
FIG. 15 is a schematic view of another exemplary configuration of the electronic vapor dispenser.

A variety of electric vaporizing devices used as electronic cigarettes can be used as vaporizer housing 6 or the components of such devices can be used as the components of vaporizer housing 6. With electronic cigarettes, the user's lungs or mouth draw air through the device and the air activates a sensor or pressure switch which creates the electrical connection between the vaporizing element 52 and the battery. In device 2, electric vaporizing element 52 is powered before, at the same time, or at a time delayed from the activation of airflow generator 20. In this configuration of device 2, the activation of vaporizing element 52 is not controlled by airflow. In this configuration, the power circuit that energizes vaporizing element 52 includes activation element 56 that completes the power circuit when a signal is received resulting from the activation of device 2. In the FIG. 1 configuration, element 56 is carried by vaporizer housing 6. In the configurations of FIGS. 14 and 15, activation element 56 is carried by base 4 and activation element 56 can be incorporated as part of controller 60. In the FIG. 1 configuration, the signal that energizes electric vaporizing element 52 is delivered from a component of base 4 through dock 30 or provided through a wireless signal. In the FIGS. 14 and 15 configurations, the circuit that energizes vaporizing element 52 passes through dock 30. As described above, this circuit includes connector 68 and the threaded connection 40/42. In another configuration, the power circuit is not formed through the threaded connection but, instead, through connectors (on base 4 and a complementary connectors on vaporizer housing 6) that are joined or are in close proximity power coupling when vaporizer housing 6 is disposed in dock 30.

In optional configurations for the devices of FIGS. 14 and 15, power source 54 is removed from vaporizer housing 6 and the power for electric vaporizer element 52 is delivered from power source 10 or power source 14. These configurations eliminate the need for power source in the vaporizer housing 6 thus making housing 6 less complicated as easier to make as a disposable, single-use element of device 2. The user can readily switch housings 6 to provide different scents and readily replace empty housings 6. The power circuit from power source 10 can flow through the threads 40/42 or separate electrical connectors as described above. In these configurations, electric vaporizing element 52 can be energized immediately when device 2 is turned on or activation element 56 is used to control the application of electric power to electric vaporizing element 52.

The powering of electric vaporizing element 52 can be delayed with a timer or a delay circuit provided as part of or in conjunction with activation element 56 to allow airflow to be delivered past vaporizing element 52 before it is powered.

This system can also control the length of time electric vaporizing element 52 is energized. Synchronizing electronic vaporizing element 52 with sufficient airflow and controlling the time that vaporizing element 52 is powered not only controls the quality of the vapor being dispensed but can prevents undesired smells generated from a vaporizing element 52 that is too hot. This prevents the user from activating vaporizing element 52 too long without airflow. This also prevents the user from energizing vaporizing element 52 too long and causing damage. Some electric vaporizing elements 52 will generate undesirable burning smells if used too frequently or for too long.

In one form, a push button switch 62 powers airflow generator 20 delivers the electric signal to activation element 56. When switch 62 is released, airflow generator 20 is turned off and activation element 56 stops the delivery of power to electric vaporizing element 52.

In another configuration, device 2 is activated for a set amount of time when switch 62 is pushed and then automatically turns off. In other configurations, a controller 60 is used to provide a series of timed vapor distributions. Controller 60 allows device 2 to be programmed for patterned releases of vapor. Controller 60 can be operated remotely through a wireless communications protocol and can include an antenna 64 or a sensor (like an infrared sensor) on the exterior of base 4.

In a further configuration where the airflow generator is in the form of a squeezable bladder or physical bellows, a sensor detects the deformation of the squeezable bladder and delivers the signal to activation element 56 and results in the powering of vaporizing element 52.

Device 2 can be provided with controller 60 that provides operating configurations that are more useful for some hunting situations. Controller 60 includes at least a single button 62 and at least an indicator light 66 that provides a visual indication related to the operating condition of device 2. Each operating condition is preprogrammed for a different distribution timing pattern. An exemplary setting for the operation of the device is to vaporize for three seconds and then turn off for ninety seconds when the sequence is repeated. This sequence can be set to repeat a number of times or for a length of time as desired by the user. In another exemplary setting, the device 2 can be programmed to create and dispense vapor for 60 or 180 seconds upon the push of a button (either directly or through a remote control) and then turn off. In another example, the first condition can be a long continuous distribution of vapor (such as sixty, ninety, or 180 seconds) followed by ninety minutes of short bursts (such as ten seconds) spaced apart every three minutes. The second configuration can be set to distribute medium bursts (thirty seconds) at longer time intervals (every ten minutes) for an extended time (such as two hours). The third and fourth conditions can have other variations such as short-long-short and very long-very long-very long. In the configuration depicted in FIG. 1, programmable controller 60 allows the user to define the distribution pattern of device 2. Controller 60 allows the user to control the timing of the vapor distribution, the time intervals between distributions, and the volume of the vapor distribution. Controller 60 can include a programmable circuit board that includes a timer.

The settings of controller 60 can be changed through push buttons accessible to the user or through a wireless communications protocol. A visible screen can be used to display the settings to the user. In other configurations, a wireless communications circuit is used to allow the user to communicate with controller 60 through WIFI or Bluetooth communications protocols such that device 2 can be set up through software on a user's phone.

Another configuration uses a radio frequency or infrared remote control to turn on device 2. Device 2 can then run through its timed pattern and automatically turn off. Alternatively, the user can turn device 2 off using the same control. This can be entirely manual to allow to the hunter to control the creation and distribution of the vapor.

In other configurations, an airflow sensor or pressure sensor can be used to activate the vaporizing element when the airflow is delivered to vaporizer housing 6. The airflow sensor or pressure sensor can be carried by base 4 such as within tube 24, at base airflow outlet 22, or at plenum 23. The airflow sensor or pressure sensor activates power delivery to vaporizing element in response to the delivery of airflow.

In each of the embodiments describe above, the vaporizable liquid material that is being vaporized includes a glycol substance that can be used to form a visible vapor. The glycol substance can be used alone as a wind direction indicator or in combination with an aromatic material such as a lure or cover scent. The glycol substance can be a propylene glycol, a vegetable glycerin, a combination of both, and/or a combination of these with water. The aromatic materials are mixed with the glycol substance to provide the liquid vaporizable material. The aromatic material can provide a scent to cover the hunter's scent such as pine, acorn, cedar, or other scent that is naturally present at the site of the hunt. The aromatic material can be provided as a lure in the form of a liquid or solid animal urine or glandular secretion. The aromatic material can be a combination of solid and/or liquid materials that mimic animal urine or glandular secretions (synthetic urine) such as different combinations of NaCl (sodium chloride), MgSO4 (Magnesium Sulfate), urea, CaCl2) (calcium chloride) and ammonia. The solid animal lure substance materials can be made by dehydration. In any of these combinations, water can be added as needed. The dehydrated urine can be formed by freeze drying, flash drying liquid urine, or otherwise dehydrating the liquid urine to form the additive to the glycol.

One method of using device 2 is to provide device with a repellant scent that drives game away from the scent. Device 2 is used along a boundary to control the movement of game or in an area such as a user's yard wherein the user does not want the game to cross or to congregate. The repellant material can include the scent of a predator, a soap, tallow, a human, a dog, or the like. The user can set a scent fence line of vaporizing devices timed to form and distribute the vaporized scent at periodic times. This creates a scent barrier than helps keep game from passing through the area. This configuration of the device can be used to deter game such as deer from entering a garden area or a landscaped area where the deer feed on the plantings.

Also, the aromatic material can be a pleasant-smelling material that one can use to freshen room air or an automobile. These aromatic materials can be clean-smelling materials, flower-based materials, fruit-based materials, pleasant-smelling food materials, pleasant-smelling outdoor smells, spices, tropical smells, and others enjoyable to human users. These can be provided as oils or powders and mixed with the glycol substance.

The liquid scent material also can be a vaporizable material that functions to eliminate or reduce scent. The vaporizable liquid scent material includes a percentage of carbon, charcoal, activated carbon, coconut shell activated carbon, palm kernel shell charcoal, an odor elimination chemical, the odor elimination substance Neuessence, the odor elimination substance Ordenone®. or a combination of these substances. The combination of these substances with a vaporizable material such as the glycol materials disclosed above allow a scent elimination substance to be generated to be used by a hunter to eliminate or reduce scents that can alert game to the hunter's presence.

These devices have the advantage of only vaporizing the liquid on demand. The devices do not waste the vaporizable liquid by continuously vaporizing unless the user selects continuous operation as an option. The device will function in cold weather and the vaporized glycol-based vapor substance hangs in the air and does not distribute itself in the air as fast as other scent materials. The electric heating element does not create any additional fuel scent through a combustion process. The removable and replaceable vaporizer housing 6 keeps the scent fresh and allows the user to readily replace new scent and reuse the device without skin contact with the scent liquid. There is also no risk of spilling the liquid. The user can program the device to automatically freshen the scent at intervals.

An optional alternative use for the device is to attach a housing 6 to the device that creates a pleasant smelling vapor for use in deodorizing a vehicle, a house, clothing, and the like. An advantage here is that by using the removable housing 6, there is no deer urine scent left on the device when a pleasant smelling scent is installed. This is especially true when the housings 6 carry their own vaporizing coils.

As such, the same device used to distribute the deer urine smell can also be used to distribute a pleasant smelling vapor—such as a vanilla—for the hunter's vehicle on the drive home.

In the foregoing description, certain terms have been used for brevity, clearness, and understanding. No unnecessary limitations are to be implied therefrom beyond the requirement of the prior art because such terms are used for descriptive purposes and are intended to be broadly construed. Moreover, the description and illustration of the invention is an example and the invention is not limited to the exact details shown or described. Modifications and alterations of those embodiments will be apparent to one who reads and understands this general description. The present disclosure should be construed as including all such modifications and alterations insofar as they come within the scope of the appended claims or equivalents thereof. Throughout the description and claims of this specification the words "comprise" and "include" as well as variations of those words, such as "comprises," "includes," "comprising," and "including" are not intended to exclude additives, components, integers, or steps.

The invention claimed is:

1. An electronic vaporizing device for use during hunting; the device comprising:
    a base having a first power supply, an airflow generator, and a base control device that selectively powers the airflow generator with power from the first power supply;
    a vaporizer housing having an airflow inlet, an electric vaporizing element, a supply of liquid vaporizable material, and an outlet;
    the vaporizer housing having a second power supply selectively connectable with the electric vaporizing element through an activation element to energize the electric vaporizing element to vaporize liquid vaporizable material from the supply into a vapor;
    the activation element carried by the vaporizer housing;
    the vaporizer housing being removably mountable to the base at a dock;
    the activation element being electrically connected to the base control through the dock; and
    the airflow generator adapted to selectively deliver an airflow to an airflow inlet of the vaporizer housing when the electric vaporizer is mounted to the base.

2. The device of claim 1, wherein the liquid vaporizable material includes at least one of a propylene glycol and a vegetable glycerin.

3. The device of claim 2, wherein the liquid vaporizable material further includes at least one of a lure scent, a cover scent, and a repellant scent.

4. The device of claim 2, wherein the liquid vaporizable material further includes a scent elimination material.

5. The device of claim 1, wherein the vaporizer housing is removably connected to the base with complementary threads disposed on the vaporizer housing and the dock.

6. The device of claim 5, wherein the activation element is electrically connected to the base control through the threads of the vaporizer housing and the dock.

7. The device of claim 6, wherein the dock is recessed within the base.

8. The device of claim 7, wherein a majority of the vaporizer housing is disposed within the base when the vaporizer housing is connected to the base.

9. An electronic vaporizing device for use during hunting; the device comprising:
    a base having a power supply, an electric airflow generator, and a base control device that selectively powers the airflow generator with power from the power supply;
    the base defining a threaded dock; the dock being recessed within the base;
    a vaporizer housing having an airflow inlet, an electric vaporizing element, a supply of liquid vaporizable material, and an outlet;
    the vaporizer housing having a threaded portion threadedly connected to the threaded dock to removably and replaceably mount the vaporizer housing to the base; the threaded connection being recessed within the base;
    the base and vaporizer housing defining an electric circuit between the power supply and the electric vaporizing element when the vaporizer housing is mounted to the base; the electric circuit passing through the threaded connection between of the vaporizer housing and the dock; and
    the electric airflow generator adapted to selectively deliver an airflow to an airflow inlet of the vaporizer housing when the vaporizer housing is mounted to the base.

10. The device of claim 9, wherein the liquid vaporizable material includes at least one of a propylene glycol and a vegetable glycerin.

11. The device of claim 10, wherein the liquid vaporizable material further includes at least one of a lure scent, a cover scent, and a repellant scent.

12. The device of claim 10, wherein the liquid vaporizable material further includes a scent elimination material.

13. The device of claim 9, wherein the electric vaporizing element is a ceramic vaporizing element.

14. The device of claim 9, wherein the base includes an activation element that selectively powers the electric vaporizing element.

15. An electronic vaporizing device for use during hunting; the device comprising:
    a base having a power supply, an electric airflow generator, and a base control device that selectively powers the electric airflow generator with power from the power supply;
    the base defining a recessed dock that defines a base airflow outlet;
    a vaporizer housing having a housing airflow inlet, an electric vaporizing element, a supply of liquid vaporizable material, and an outlet;
    the vaporizer housing being removably mounted to the dock of the base with the housing airflow inlet aligned with the base airflow outlet;
    a portion of the vaporizer housing disposed within the base when the vaporizer housing is mounted to the base; and
    the base and vaporizer housing defining an electric circuit between the power supply and the electric vaporizing element when the vaporizer housing is mounted to the base; the electric circuit passing through the dock.

16. The device of claim 15, wherein the liquid vaporizable material includes at least one of a propylene glycol and a vegetable glycerin.

17. The device of claim 16, wherein the liquid vaporizable material further includes at least one of a lure scent, a cover scent, and a repellant scent.

18. The device of claim 16, wherein the liquid vaporizable material further includes a scent elimination material.

19. The device of claim 15, wherein the base defines a base airflow outlet at the dock; the airflow generator having an airflow outlet in fluid communication with the base airflow outlet.

20. The device of claim 19, wherein the vaporizer housing is threaded to the base at the dock.

21. The device of claim 20, wherein a portion of the electric circuit is defined by the threaded connection between the vaporizer housing and the base.

22. An electronic vaporizing device for use during hunting; the device comprising:
a generally cylindrical base having a lower end and an upper end;
the generally cylindrical base carrying a power supply at the lower end;
the generally cylindrical base also carrying an electric airflow generator, and a base control device that selectively powers the electric airflow generator with power from the power supply;
the generally cylindrical base defining a recessed dock that defines a base airflow outlet; the recessed dock opening through the upper end of the generally cylindrical base;
a generally cylindrical vaporizer housing having a housing airflow inlet, an electric vaporizing element, a supply of liquid vaporizable material, and an outlet;
the generally cylindrical vaporizer housing being removably mounted to the dock of the base with the housing airflow inlet aligned with the base airflow outlet;
a portion of the generally cylindrical vaporizer housing disposed within the generally cylindrical base when the generally cylindrical vaporizer housing is mounted to the generally cylindrical base;
a portion of the generally cylindrical vaporizer housing disposed directly between the electric airflow generator and the base control device;
the base and vaporizer housing defining an electric circuit between the power supply and the electric vaporizing element when the vaporizer housing is mounted to the base; the electric circuit passing through the dock.

23. The device of claim 22, wherein the liquid vaporizable material includes at least one of a propylene glycol and a vegetable glycerin.

24. The device of claim 23, wherein the liquid vaporizable material further includes at least one of a lure scent, a cover scent, and a repellant scent.

25. The device of claim 23, wherein the liquid vaporizable material further includes a scent elimination material.

26. The device of claim 22, wherein the generally cylindrical base defines a base airflow outlet at the dock; the electric airflow generator having an airflow outlet in fluid communication with the base airflow outlet.

27. The device of claim 26, wherein the generally cylindrical vaporizer housing is threaded to the recessed dock.

28. The device of claim 27, wherein a portion of the electric circuit is defined by the threaded connection between the generally cylindrical vaporizer housing and the recessed dock.

29. The device of claim 26, further comprising a flexible airflow tube disposed between an airflow outlet of the electric airflow generator and the base airflow outlet at the dock.

* * * * *